Feb. 28, 1961 W. F. COLLISON 2,972,978
SHAFT POSITION INDICATOR
Filed June 15, 1959 2 Sheets-Sheet 1

INVENTOR.
WILLIAM F. COLLISON
BY
Knox & Knox

Feb. 28, 1961 W. F. COLLISON 2,972,978
SHAFT POSITION INDICATOR
Filed June 15, 1959 2 Sheets-Sheet 2

INVENTOR.
WILLIAM F. COLLISON
BY
Knox & Knox

United States Patent Office 2,972,978
Patented Feb. 28, 1961

2,972,978
SHAFT POSITION INDICATOR

William F. Collison, Escondido, Calif., assignor to Non-Linear Systems, Inc., Del Mar, Calif.

Filed June 15, 1959, Ser. No. 820,357
11 Claims. (Cl. 116—115)

The present invention relates generally to indicating instruments and more particularly to a shaft position indicator.

Previous devices for indicating the orientation or position of a shaft, dial or knob have generally been of either analogue or digital type. An analogue indicator is usually a scale or dial equipped with a pointer which, unless made very large, is difficult to read from any distance. Digital indicators may employ a mechanical system containing a geared drive or even a Geneva type mechanism, or may be of the electrical rotary switch type which is bulky and subject to malfunction. While the electrical type may be used to illuminate large and easily readable numbers or other indicating indicia, the arrangement is complex and expensive compared to a simple rotary dial.

The primary object of this invention, therefore, is to provide a shaft position indicator in which various shaft positions are indicated by large illuminated numerals, yet which does not require any mechanisms or elaborate electrical circuitry.

Another object of this invention is to provide a shaft position indicator which is entirely contained in a large knob attached directly to the shaft, the numerals appearing in the center of the knob.

Still another object of this invention is to provide a shaft position indicator which utilizes a constantly operating, stationary source of illumination and requires no switches of any kind.

A further object of this invention is to provide a shaft position indicator which is self-contained and may be installed on any panel or supporting surface as a unit.

Another object of this invention is to provide a shaft position indicator which is adapted for fabrication from many different materials, so that the choice of material can be according to the dictates of availability and price considerations, the exact sizes and proportions being matters easily determined to suit particular conditions and needs.

Finally, it is an object to provide a shaft position indicator of the aforementioned character which is simple and convenient to make and use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
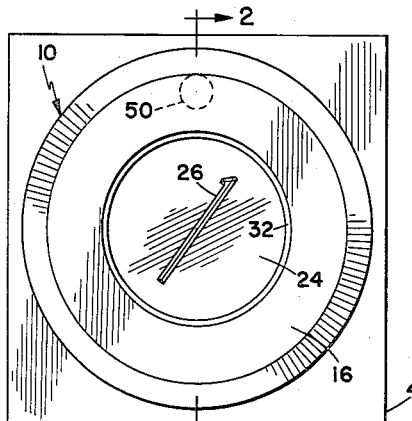
Figure 1 is a front elevation view of the indicator.

Referring now to Figures 1-7 of the drawings, the indicator comprises a large cylindrical knob 10 having an inner sleeve 12 and an outer sleeve 14 concentric therewith, the sleeves being connected at their forward ends by a closure ring 16. The knob 10 thus has an annular channel 18 between the sleeves 12 and 14, said channel being closed at the forward end and open at the rear. The inner sleeve 12 is closed at the rear end by a back plate 20 to which is fixed an axially extending shaft 22 of any suitable length. The entire knob 10 may be cast from metal or plastic, the shaft 22 being unitary therewith or suitably fixed in the back plate 20.

Inside the inner sleeve 12 are a plurality of stacked numeral discs 24 of clear transparent material, either of glass as indicated, or of plastic material such as Lucite. Each disc 24 has a numeral cut into one face thereof, as indicated at 26, the surfaces of the cut numerals being roughened or left unpolished so as to be somewhat opaque compared to the remainder of the disc. The total number of discs 24 is variable according to the number of shaft positions to be indicated, one disc being necessary for each position. Ten discs 24 are illustrated as an example and the discs are oriented so that one numeral 26 only is upright at any one shaft position. To ensure proper alignment of the discs 24 and prevent their rotation relative to said knob 10, each disc has a small notch 28 in the edge thereof, the notches being engaged by an axially extending rib 30 on the inner wall of the inner sleeve 12. The discs 24 are held in place against axial movement by a retaining ring 32 fitted into an annular groove 34 inside the inner sleeve 12.

Each disc 24 has an opaque circumferal edge 36 except for a small rectangular window panel 38 positioned vertically above the numeral 26. The inner sleeve 12 is provided with a plurality of rectangular window slots 40 which are aligned with and correspond to the window panels 38 when the discs 24 are secured in place. Due to the angular displacement of each numeral 26 relative to the other numerals, the window slots 40 are disposed in a spaced spiral arrangement around the inner sleeve 12, and each disc is exposed to the annular channel 18 at a different position, progressively axially and circumferentially offset from the others.

The knob is attached to a mounting plate 42 by means of the shaft 22 which is rotatable in a bearing 44 secured in said plate, the shaft being held in place by a retaining ring 46. Fixed in the mounting plate 42 and radially offset from the shaft 22 is a lamp socket 48 in which is an elongated lamp 50. The socket 48 is positioned so that the lamp 50 is enclosed in the annular channel 18, said lamp being long enough to extend axially of the channel throughout the aggregate depth of the discs 24, as in Figure 2. Extending from the socket 48 are two parallel arms 52, one on each side of the lamp 50, and fixed to said arms are flexible shields 54 of felt or the like, said shields being a close fit between the inner and outer sleeves 12 and 14 and enclosing the lamp to prevent light leakage at the sides thereof.

Figure 2:
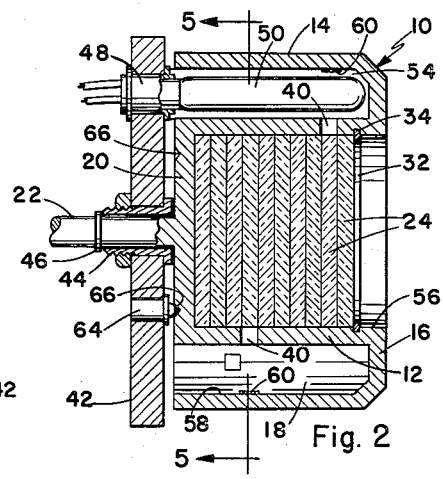
Figure 2 is a sectional view taken on the line 2—2 of Figure 1.
Figure 3:
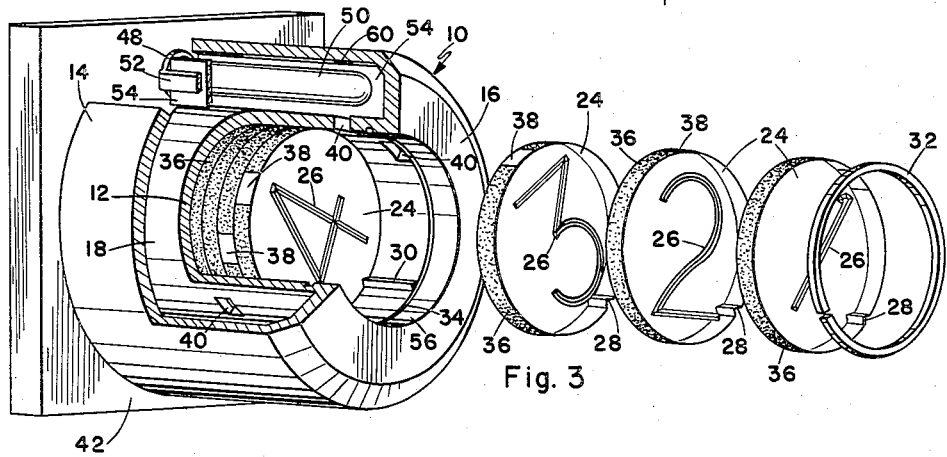
Figure 3 is a partially exploded, cutaway perspective view of the indicator.
Figure 4:
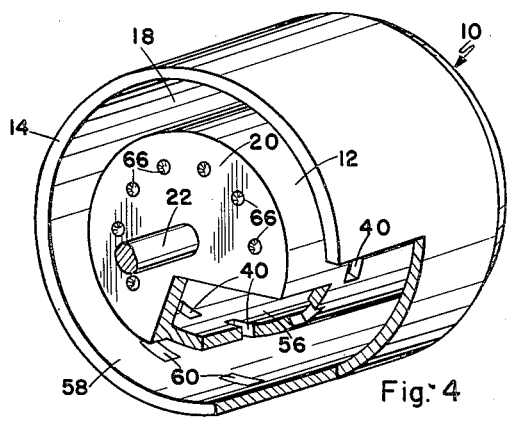
Figure 4 is a rear perspective view, partially cut away, of the knob portion of the indicator.
Figure 5:
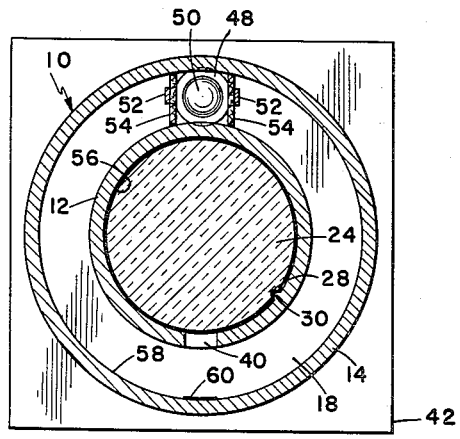
Figure 5 is a sectional view taken on the line 5—5 of Figure 2.
Figure 6:
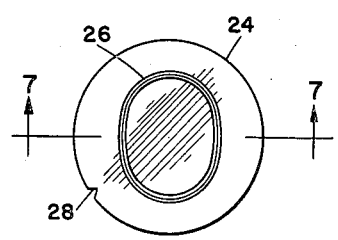
Figure 6 is a front elevation view of a single numeral disc.
Figure 7:
Figure 7 is a sectional view taken on the line 7—7 of Figure 6.

As each window slot 40 is aligned with the lamp 50, the disc 24 exposed through that window slot will be illuminated, the cross-illumination causing the rough surfaced numeral 26 to stand out clearly and be readily visible from the front of the knob 10. In Figures 2 and 3, the knob 10 is positioned so that the second disc 24 having the number 2 thereon is illuminated, but due to the shields 54, none of the other discs are illuminated. While the numerals 26 are substantially opaque, they retain a certain translucency and do not obstruct vision of the rearmost discs when they are illuminated. It has been found that a considerable number of discs 24 may be stacked without objectionable obstruction of vision, each illuminated numeral being readable through the remainder of the discs. As an additional precaution against simultaneous illumination, the inner surface 56 of the inner sleeve 12 and the inner surface 58 of the outer sleeve 14 are blackened, or otherwise made light absorptive. However, to concentrate the light in the required area, the inner surface 58 of the outer sleeve 14 may be provided with small reflector panels 60 radially aligned with the window slots 40, as in Figures 2 and 4, so that additional light is reflected through the particular window slot in register with the lamp 50.

In certain applications it may be necessary to determine the position of a shaft turned by some remote means and in such an instance, the shaft 22 must be freely rotatable. When it is desirable to set the shaft 22 to a selected position by manually turning the knob 10, it is desirable to have means for indexing the knob to ensure accurate alignment of the window slots 40 with the lamp 50. To accomplish this a small spring loaded, ball detent 64 is fixed in the mounting plate 42 and the knob back plate 20 is provided with a plurality of shallow sockets 66 spaced around a circle concentric with shaft 22. The sockets 66 correspond in number to the number of discs 24 and are disposed so that each disc is properly oriented for illumination at one indexed position of the knob 10.

Figure 8:
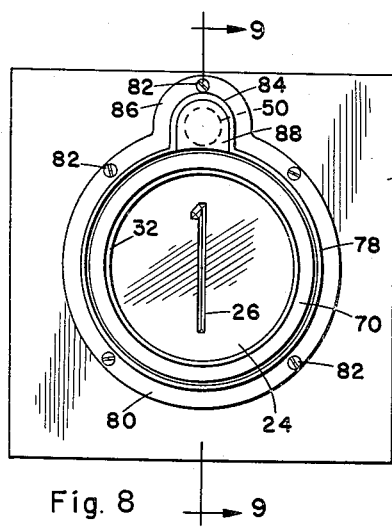
Figure 8 is a front elevational view of a slightly modified form of the indicator.
Figure 9:
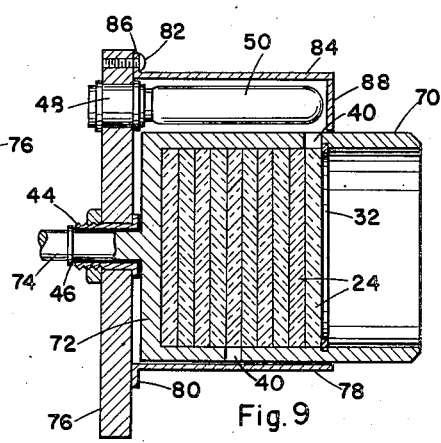
Figure 9 is a sectional view taken on the line 9—9 of Figure 8.

The structure illustrated in Figures 8 and 9 is a somewhat simplified form of the device and includes a cylindrical knob 70 having one end closed by a back plate 72, extending from which is a shaft 74. The knob 70 is attached to a mounting plate 76, the shaft 74 being rotatable in a bearing 44 and held by a retaining ring 46. The knob 10 corresponds in all respects to the inner sleeve 12 of knob 10 and contains a plurality of discs 24 secured by a retaining ring 32, each disc being aligned as previously described with a window slot 40. In this particular structure, however, the outer sleeve of the knob is omitted and instead, the knob 70 is enclosed in a cylindrical shield sleeve 78 having at one end a radially extending flange 80 which is secured to the mounting plate 76 by suitable screws 82. The shield sleeve 78 extends axially to enclose the entire portion of the knob 70 containing the window slots 40. At the top of the mounting plate 76 is a lamp socket 48 and lamp 50, said lamp being enclosed in an elongated housing 84 integral with the shield sleeve 78, said housing also having a flange portion 86 for attachment to said mounting plate. The forward end of the housing 84 is closed by an end plate 88 to conceal the lamp 50, the width of said housing being substantially equal to the width of a single window slot 40, so that only one window slot can be fully exposed to the lamp at a time.

This modified form of the indicator operates in a similar manner to that previously described, each disc 24 being selectively illuminated by rotation of the knob 70. The single sleeve construction of the knob 70 is less bulky and simpler to make than the double-walled knob 10 and may be more desirable in certain applications.

While the discs are illustrated as circular for simplicity, they may easily be made polygonal with any desired number of sides. Also each disc may have more than one window panel 38, so that a particular numeral can be illuminated more than once for each revolution of the shaft in a predetermined sequence, according to requirements. The lamp 50 need not necessarily be a conventional lamp but may be an elongated light conducting member such as a Lucite rod illuminated by a remote source, or even an arrangement of reflectors to distribute the light as required.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A shaft position indicator, comprising: a generally knob-like member having a deep socket therein; a shaft fixed to and extending axially from said member for rotatable attachment to a support; a plurality of flat transparent elements stacked axially of said socket and in fixed relation to said member; said transparent elements having indicia inscribed thereon, the indicia being substantially less transparent than the remainder of the elements; said member having a plurality of circumferentially spaced openings, each of said openings being aligned with the edge of one of said transparent elements; and a light source fixed circumferentially of said member, whereby when the member is rotated, each of said transparent elements is illuminated successively and individually.

2. A shaft position indicator, comprising: a generally knob-like member having a deep socket therein; a shaft fixed to and extending axially from said member for rotatable attachment to a support; a plurality of flat transparent elements stacked axially of said socket and in fixed relation to said member; said transparent elements having indicia inscribed thereon, the indicia being substantially less transparent than the remainder of the elements; said member having a plurality of circumferentially spaced openings; each of said openings being aligned with the edge of one of said transparent elements; a light source fixed circumferentially of said member; shield means surrounding said light source and restricting the light distribution to an area sufficient to cover a single one of said openings at a time, whereby when said member is rotated, each of said transparent elements is illuminated successively and individually.

3. A shaft position indicator, comprising: a generally knob-like member having a deep socket therein; a shaft fixed to and extending axially from said member for rotatable attachment to a support; a plurality of flat transparent elements stacked axially of said socket and in fixed relation to said member; said transparent elements having indicia inscribed thereon, the indicia being substantially less transparent than the remainder of the elements; said member having a plurality of circumferentially spaced openings, each of said openings being aligned with the edge of one of said transparent elements; a light source fixed circumferentially of said member; shield means surrounding said light source and restricting the light distribution to an area sufficient to cover a single one of said openings at a time, whereby when said member is rotated, each of said transparent elements is illuminated successively and individually; and indexing means operatively engageable with said member to index each of said openings in alignment with said light source.

4. A shaft position indicator, comprising: a generally cylindrical knob having a deep internal socket; a shaft fixed to and extending axially from said knob; a support member in which said shaft is rotatably held; a plurality of flat, transparent disc elements stacked axially of said socket and in fixed relation to said member; said disc elements having indicia inscribed thereon, the indicia being substantially less transparent than the remainder of the disc elements; said knob having a plurality of circumferentially and axially spaced openings, each of said openings being aligned with the edge of one of said disc elements; and a light source fixed externally adjacent said knob, whereby when the knob is rotated, each of said disc elements is illuminated successively and individually.

5. A shaft position indicator, comprising: a generally cylindrical knob having a deep internal socket; a shaft fixed to and extending axially from said knob; a support member in which said shaft is rotatably held; a plurality of flat, transparent disc elements stacked axially of said socket and in fixed relation to said member; said disc elements having indicia inscribed thereon, the indicia being substantially less transparent than the remainder of the disc elements; said knob having a plurality of circumferentially and axially spaced openings, each of said openings being aligned with the edge of one of said disc elements; a light source fixed adjacent said knob; a shield enclosing said light source and restricting the light distribution to an area sufficient to cover a single one of said openings at a time, whereby when said knob is rotated, each of said disc elements is illuminated successively and individually.

6. A shaft position indicator, comprising: a generally cylindrical knob having a deep internal socket; a shaft fixed to and extending axially from said knob; a support member in which said shaft is rotatably held; a plurality of flat, transparent disc elements stacked axially of said socket and in fixed relation to said member; said disc elements having indicia inscribed thereon, the indicia being substantially less transparent than the remainder of the disc elements; said knob having a plurality of circumferentially and axially spaced openings, each of said openings being aligned with the edge of one of said disc elements; a light source fixed adjacent said knob; a shield enclosing said light source and restricting the light distribution to an area sufficient to cover a single one of said openings at a time, whereby when said knob is rotated, each of said disc elements is illuminated successively and individually; and a generally cylindrical, imperforate shield enclosing the remainder of said knob and excluding extraneous light from the openings not exposed to said light source.

7. A shaft position indicator, comprising: a knob including a cylindrical inner sleeve having one closed end, and an outer sleeve concentric with said inner sleeve; said inner and outer sleeves being interconnected at the end remote from said closed end and defining an annular channel therebetween; a shaft fixed to and extending axially from said closed end; a support member in which said shaft is rotatably held; a plurality of flat, transparent disc elements stacked axially of and in fixed relation in said inner sleeve; said disc elements having indicia inscribed thereon, the indicia being substantially less transparent than the remainder of the disc elements; said inner sleeve having a plurality of circumferentially and axially spaced openings; each of said openings being aligned with the edge of one of said disc elements; a light source mounted on said support member and extending into said annular channel, whereby when said knob is rotated, each of said disc elements is illuminated successively and individually.

8. A shaft position indicator, comprising: a knob including a cylindrical inner sleeve having one closed end, and an outer sleeve concentric with said inner sleeve; said inner and outer sleeves being interconnected at the end remote from said closed end and defining an annular channel therebetween; a shaft fixed to and extending axially from said closed end; a support member in which said shaft is rotatably held; a plurality of flat, transparent disc elements stacked axially of and in fixed relation in said inner sleeve; said disc elements having indicia inscribed thereon, the indicia being substantially less transparent than the remainder of the disc elements; said inner sleeve having a plurality of circumferentially and axially spaced openings; each of said openings being aligned with the edge of one of said disc elements; a light source mounted on said support member and extending into said annular channel; shields fixed on opposite sides of said light source restricting the light distribution to an area sufficient to cover a single one of said openings at a time, whereby when said knob is rotated, each of said disc elements is illuminated successively and individually.

9. A shaft position indicator according to claim 8 and including indexing means mounted on said support member and engageable with said knob, whereby each of said openings is indexed in alignment with said light source.

10. A shaft position indicator according to claim 8 and wherein said outer sleeve has a plurality of reflector panels on the inner surface thereof, corresponding in size to and in radial alignment with said openings.

11. A shaft position indicator, comprising: a generally cylindrical knob having a deep internal socket; a shaft fixed to and extending axially from said knob; a support member in which said shaft is rotatably held; a plurality of flat, transparent disc elements stacked in fixed relation in said socket; said disc elements having indicia inscribed thereon, the indicia being substantially less transparent than the remainder of the disc elements; said knob having a plurality of circumferentially and axially spaced openings, each of said openings being aligned with the edge of one of said disc elements; a fixed, imperforate shield sleeve surrounding said knob; said shield sleeve having an axially extending housing integral therewith; a light source fixed in said housing; said housing enclosing said light source and restricting the light distribution to an area sufficient to cover a single one of said openings at a time, whereby when said knob is rotated, each of said disc elements is illuminated successively and individually.

References Cited in the file of this patent
UNITED STATES PATENTS

| | | |
|---|---|---|
| 2,681,634 | Polley | June 22, 1954 |
| 2,751,584 | Isborn | June 19, 1956 |
| 2,766,447 | Woodson et al. | Oct. 9, 1956 |